United States Patent
Laurent et al.

(10) Patent No.: US 10,625,596 B2
(45) Date of Patent: Apr. 21, 2020

(54) FRONT OR REAR ASSEMBLY OF A MOTOR VEHICLE HAVING AN OPENING AND INCLUDING A FLEXIBLE SHUTTER FOR SEALING SAID OPENING

(71) Applicants: FLEX-N-GATE FRANCE, Audincourt (FR); Plastic Omnium Automotive Exteriors GmbH, München, Allemagne (DE)

(72) Inventors: Claude Laurent, Voujeaucourt (FR); Frederic Bois, Strasbourg (FR); Virgille Gros, Lyons (FR)

(73) Assignees: FLEX-N-GATE FRANCE, Audincourt (FR); PLASTIC OMNIUM AUTOMOTIVE EXTERIORS GMBH, München, Allemagne (DE)

( * ) Notice: Subject to any disclaimer, the term of this patent is extended or adjusted under 35 U.S.C. 154(b) by 0 days.

(21) Appl. No.: 15/761,014

(22) PCT Filed: Sep. 16, 2016

(86) PCT No.: PCT/EP2016/072055
§ 371 (c)(1),
(2) Date: Mar. 16, 2018

(87) PCT Pub. No.: WO2017/046382
PCT Pub. Date: Mar. 23, 2017

(65) Prior Publication Data
US 2018/0264933 A1    Sep. 20, 2018

(30) Foreign Application Priority Data

Sep. 17, 2015 (FR) ..................... 15 58748

(51) Int. Cl.
*B60K 11/08* (2006.01)
*B62D 35/00* (2006.01)
(Continued)

(52) U.S. Cl.
CPC ............ *B60K 11/085* (2013.01); *B60R 19/48* (2013.01); *B62D 35/005* (2013.01);
(Continued)

(58) Field of Classification Search
CPC .............. B60K 11/085; B60R 19/48; B60R 2019/1886; B60R 2019/486; B62D 35/005; B62D 35/007; Y02T 10/82; Y02T 10/88
See application file for complete search history.

(56) References Cited

U.S. PATENT DOCUMENTS 6,347,809 B1 * 2/2002 Mack .................. B62D 25/188
280/154
2007/0199751 A1    8/2007 Bradley et al.

FOREIGN PATENT DOCUMENTS

| DE | 102008013336 A1 | 9/2009 |
| FR | 2866603 A1 | 8/2005 |
| GB | 2509933 A | 1/2013 |

OTHER PUBLICATIONS

French Preliminary Search Report for application No. FR1558748, dated Aug. 4, 2016, 2 pages.
(Continued)

*Primary Examiner* — Lori L Lyjak
(74) *Attorney, Agent, or Firm* — Reising Ethington P.C.

(57) ABSTRACT

This front assembly of a motor vehicle includes a bumper skin defining an outer surface that is visible from the outside and having at least one opening formed in the outer surface. The front assembly also includes a shutter for selectively closing and releasing the opening, at least partially. The shutter includes a flexible flap having a fixed portion relative to the bumper skin and a movable portion relative to the bumper skin, wherein the movable portion is movable between a shuttering position in which the opening is
(Continued)

shuttered by the flexible flap and a releasing position in which the opening is released.

14 Claims, 3 Drawing Sheets

(51) Int. Cl.
    *B60R 19/48*     (2006.01)
    *B60R 19/18*     (2006.01)

(52) U.S. Cl.
    CPC .... *B62D 35/007* (2013.01); *B60R 2019/1886* (2013.01); *B60R 2019/486* (2013.01); *Y02T 10/82* (2013.01); *Y02T 10/88* (2013.01)

(56) References Cited

OTHER PUBLICATIONS

International Search Report for International application No. PCT/EP2016/072055, dated Oct. 18, 2016, 2 pages.
Written Opinion in French for International application No. PCT/EP2016/072055, dated Oct. 18, 2016, 5 pages.

\* cited by examiner

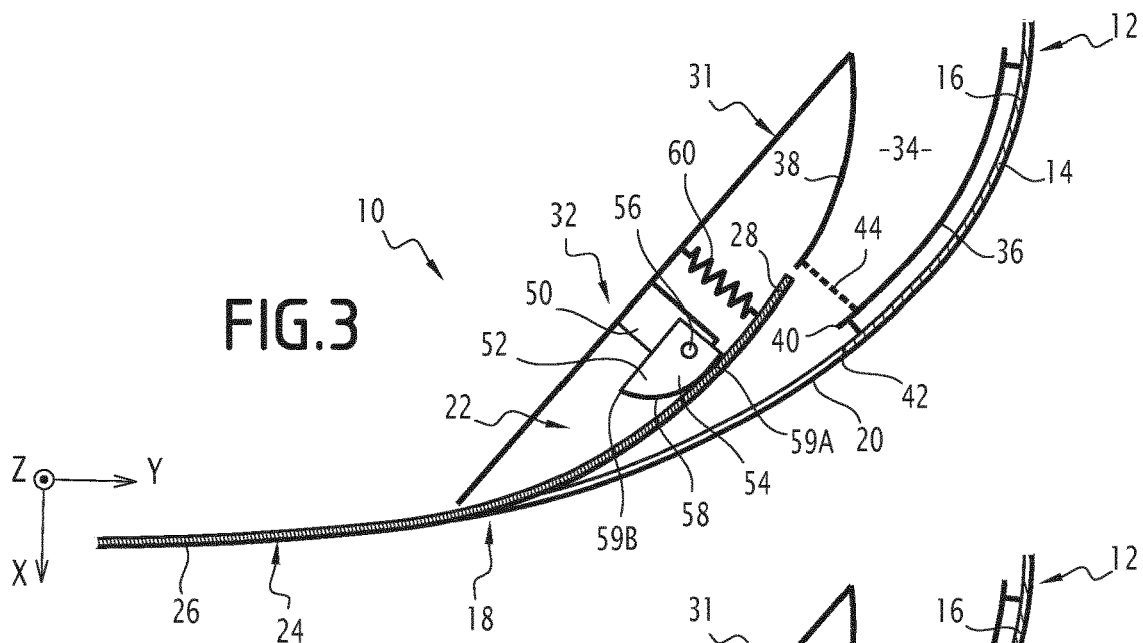
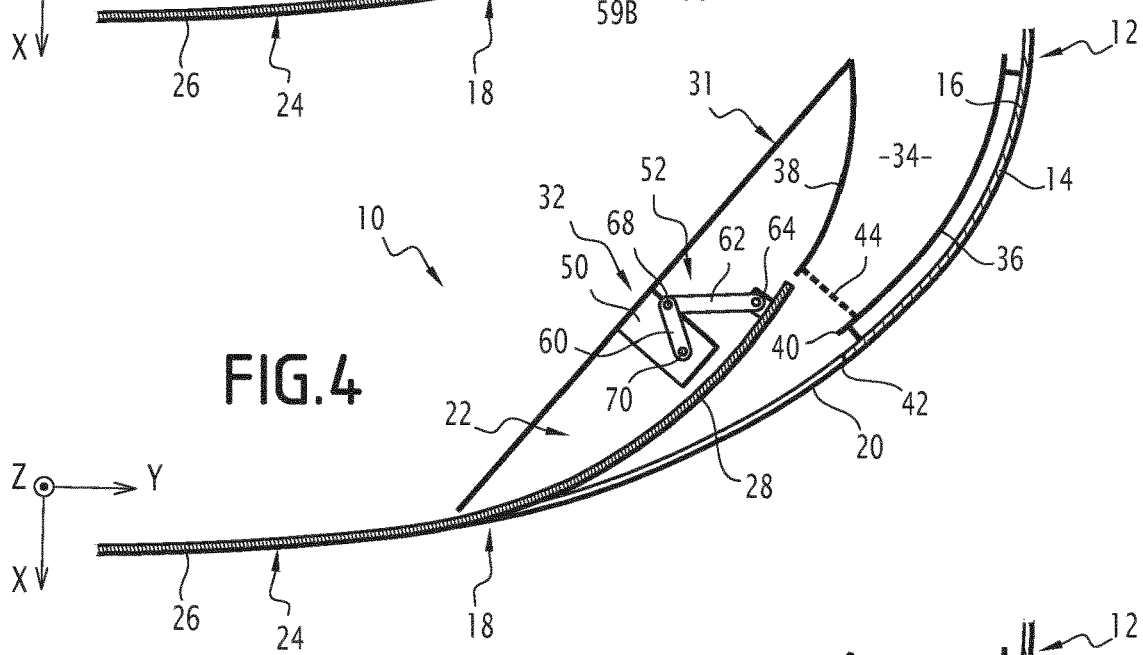
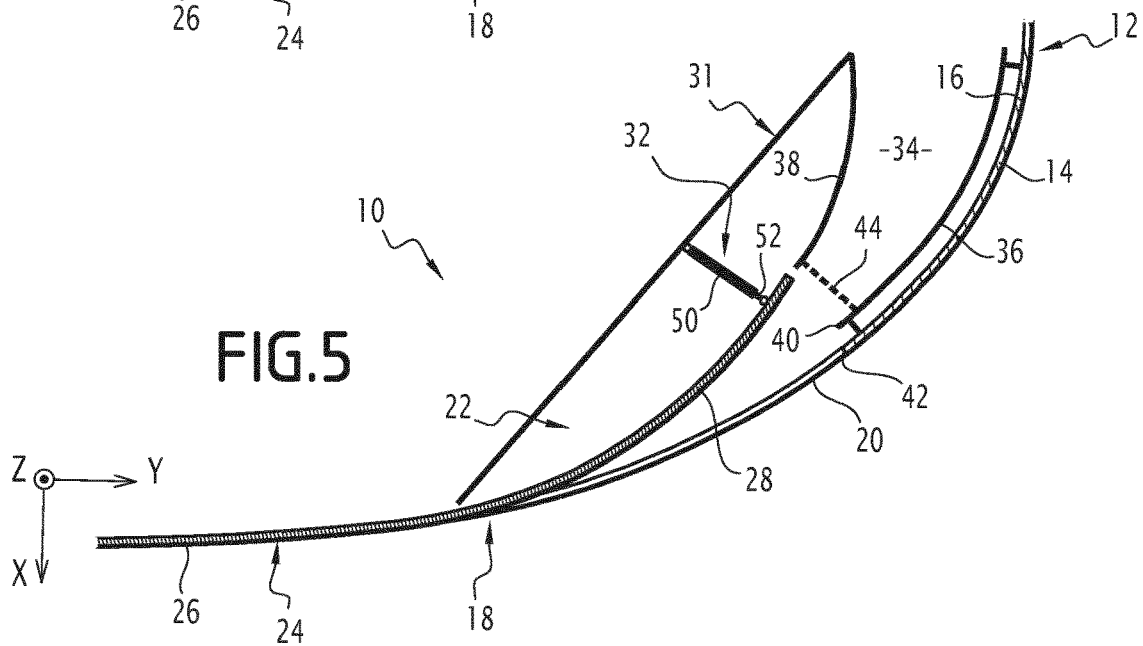

FRONT OR REAR ASSEMBLY OF A MOTOR VEHICLE HAVING AN OPENING AND INCLUDING A FLEXIBLE SHUTTER FOR SEALING SAID OPENING

TECHNICAL FIELD

The present invention relates to a front or rear assembly of a motor vehicle, of the type comprising a bumper skin defining an external surface that is visible from the outside of the front or rear assembly and having at least one opening formed in the outer surface, wherein the front or rear assembly also comprises a shutter for selectively closing and releasing the opening, at least partially.

BACKGROUND

Modern high-end motor vehicles are most often equipped with air intakes with adjustable opening. These air intakes, arranged at the front or rear of the vehicle, adjust the aerodynamics of the vehicle at speed and thus improve the fuel consumption.

In some vehicles, these air intakes are formed in the bumper skin of the vehicle. This is particularly so in the case of the vehicle described in FR 2 866 603. In other vehicles, these air intakes are arranged behind the radiator grill.

A disadvantage of existing vehicles is that they are weighed down by the mechanisms for adjusting the opening of these air intakes, a fact which negatively impacts their fuel consumption and offsets the advantage provided by the presence of the air intakes. A further disadvantage is that the aesthetics of vehicles may be negatively impacted by the presence of these air intakes that can not be hidden.

SUMMARY

An object of the invention is to allow adjustment of the opening of orifices arranged in the front or rear surface of a motor vehicle while limiting the weight of the vehicle resulting from having this adjustment possibility. Another object is to easily hide openings arranged in the front or rear of a motor vehicle.

For this purpose, the invention relates to a front or rear assembly of the aforementioned type, wherein the shutter comprises a flexible flap having a fixed portion relative to the bumper skin, and a movable portion relative to the bumper skin, wherein the movable portion is movable between a shuttering position in which the opening is shuttered by the flexible flap and a releasing position in which the opening is released.

According to particular embodiments of the invention, the front or rear assembly my also comprise one or more of the following characteristics, taken in isolation or according to any technically feasible combination:

- the flexible flap is made together in one piece with the bumper skin;
- the flexible flap is attached to the bumper skin;
- the movable portion is constituted by an end portion of the flexible flap;
- the flexible flap is elongated in an elongation direction, while the end portion is arranged at one end of the flexible flap in the elongation direction;
- the shutter comprises an actuator to control the displacement of the movable portion between its shuttering and releasing positions;
- the front or rear assembly comprises a support element arranged inside the front or rear assembly relative to the bumper skin, wherein the support element is fixed relative to the bumper skin, while the actuator is mounted between the support element and the flexible flap;
- the support element comprises an air guide having a wall extending in the prolongation of the flexible flap when the movable portion of the flexible flap is in its released position;
- the actuator comprises a cam mounted to rotate about an axis of rotation, and an electric motor to rotate the cam about the axis of rotation, wherein the cam has a surface bearing against the movable portion of the flexible flap, while the bearing surface is at a variable distance from the axis of rotation, and the shutter comprises a member to restore the movable portion bearing against the bearing surface of the cam;
- the actuator is constituted by an electric jack having an end attached to the movable portion of the flexible flap;
- the actuator comprises a first connecting rod hinged to the movable portion of the flexible flap about a first axis, and a second connecting rod hinged to the first connecting rod about a second axis that is substantially parallel to the first axis, wherein the second connecting rod is mounted to pivot relative to the bumper skin about a third axis that is substantially parallel to the first and second axes, wherein the actuator further comprises an electric motor to rotate the second connecting rod about the third axis.

BRIEF DESCRIPTION OF THE DRAWINGS

Other features and advantages of the invention will become apparent upon reading the description which follows, given solely by way of example and with reference to the appended drawings, wherein:

FIG. 3 shows a sectional view, from above, of the rear assembly of FIG. 2 according to a first variant, FIG. 4 shows a sectional view, from above, of the rear assembly of FIG. 2 according to a second variant, FIG. 5 shows a sectional view, from above, of the rear assembly of FIG. 2 according to a third variant.

DETAILED DESCRIPTION

Figure 1:
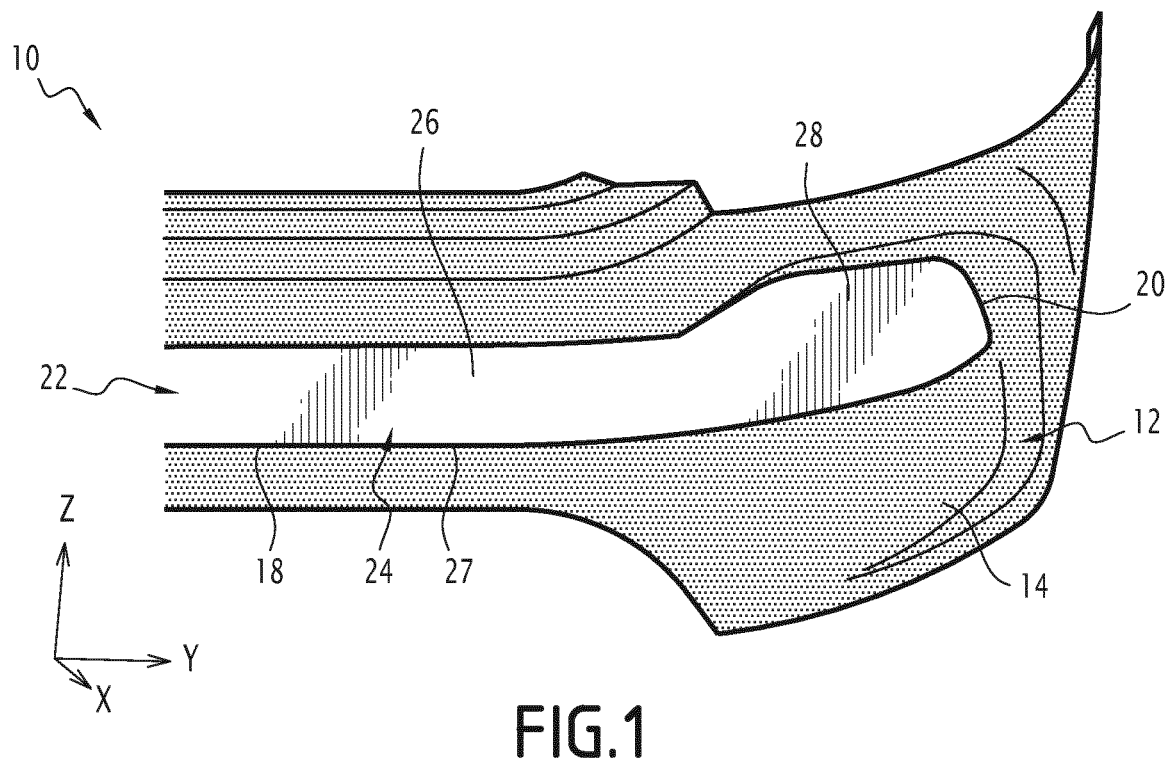
FIG. 1 shows a front view of a rear assembly according to a first embodiment of the invention, wherein an air intake opening in the rear assembly is closed.

The front assembly 10 of a motor vehicle shown in FIG. 1, comprises a bumper skin 12. This bumper skin 12 is, in a known manner, made of a flexible material such as a thermoplastic polymer, for example of polypropylene, and is intended to be mounted on a motor vehicle to cover a bumper beam (not shown) of this motor vehicle, in order to conceal it.

In the following, the orientation terms used are to be understood with reference to the orientation of the front assembly 10 when it is mounted on a motor vehicle, wherein the orientation terms used are those relating to the usual orthogonal reference frame of motor vehicles, in which we distinguish:

a longitudinal direction X, oriented from the rear to the front of the vehicle, a transverse direction Y, oriented from right to left, and defining a horizontal plane with the longitudinal direction, and a vertical direction Z, perpendicular to the horizontal plane, that is oriented from bottom to top.

The horizontal section of the bumper skin 12 has a generally convex shape with a convexity oriented towards the outside of the front assembly 10.

The bumper skin 12 has an outer surface 14, visible from the outside of the front assembly 10, and an inner surface 16 (FIG. 3) opposite the outer surface 14.

The bumper skin 12 also has at least one through-opening 18 opening into the inner surface 16 and outer surface 14. This through-opening 18 has a generally elongated shape extending in the transverse direction Y. It defines the air intake openings 20 which, in the example shown, are formed by flaring of the through-opening 18 at its transverse ends.

The front assembly 10 also includes a shutter 22 for selectively closing and releasing each of the air intake openings 20.

According to the first exemplary embodiment, this shutter 22 comprises a flexible flap 24 attached to the bumper skin 12 and facing the through-opening 18.

The flexible flap 24 is one-piece. It is typically made of the same material as the bumper skin 12.

The flexible flap 24 is elongated in a transverse elongation direction. The flexible flap 24 thus extends substantially parallel to the elongation direction of the opening 18. The flexible flap 24 extends, in particular, from a transverse end of the opening 18 to the opposite transverse end, and at a height that is at least equal to the height of the opening 18.

The flexible flap 24 comprises a central portion 26 fixed relative to the bumper skin 12, and end portions 28 that are movable relative to the bumper skin 12. These end portions 28 are each arranged at one end of the flexible flap 24 in its elongation direction.

The central portion 26 is arranged to face a central region 27 of the opening 18 interposed between the air intake openings 20. It is flush with the bumper skin 12 and completely closes the central region 27.

Figure 2:
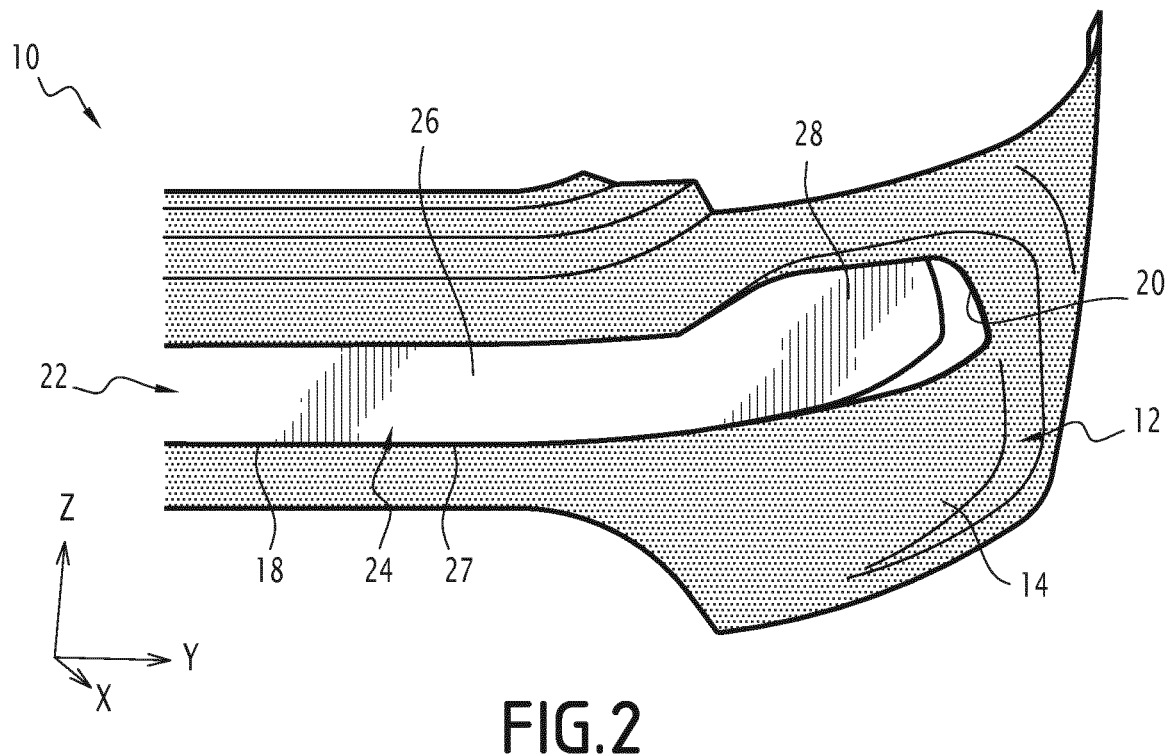
FIG. 2 shows a view similar to FIG. 1, wherein the air intake opening is released.

Each end portion 28 is arranged to face a respective air intake opening 20, and is movable relative to the bumper skin 12 between a shuttering position for shuttering the air intake opening 20 with the flexible flap 24, shown in FIG. 1, where the end portion 28 extends across the air intake 20, and a releasing position for releasing the air intake opening 20, shown in FIG. 2, where the end portion 28 is at a distance from the air intake opening 20. In particular, the end portion 28 is flush with the bumper skin 12 in the shuttering position of the air intake opening 20, while the end portion 28 is recessed towards the inside of the front assembly 10 relative to the bumper skin 12 in the releasing position of the air intake opening 20.

In a variant of this first exemplary embodiment (not shown), the bumper skin 12 has a plurality of through-openings 18, wherein each defines a respective air intake opening 20. The shutter 22 then comprises as many flexible flaps 24 as the bumper skin 12 has through-openings 18, while each flexible flap 24 is attached to the bumper skin 12 by one of its ends, wherein the end opposite the flexible flap 24 then forms a portion that is movable in a similar manner to that of the end portions 28 described above.

Figure 6:
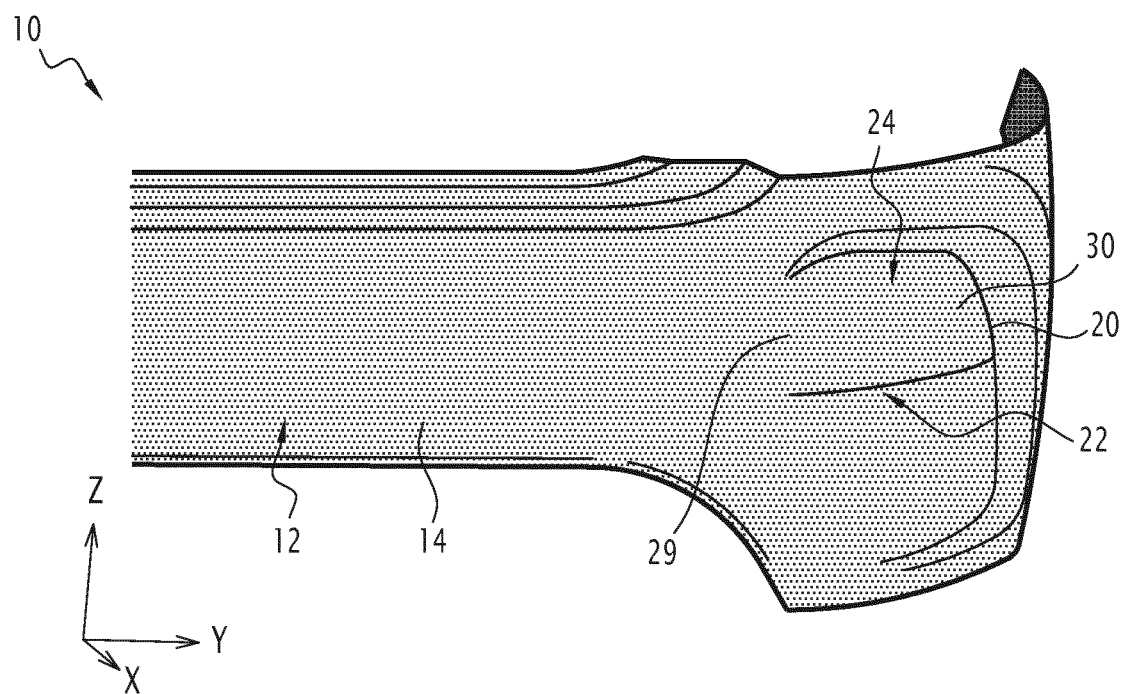
FIG. 6 shows a front view of a rear assembly according to a second embodiment of the invention, wherein an air intake opening in the rear assembly is closed.
Figure 7:
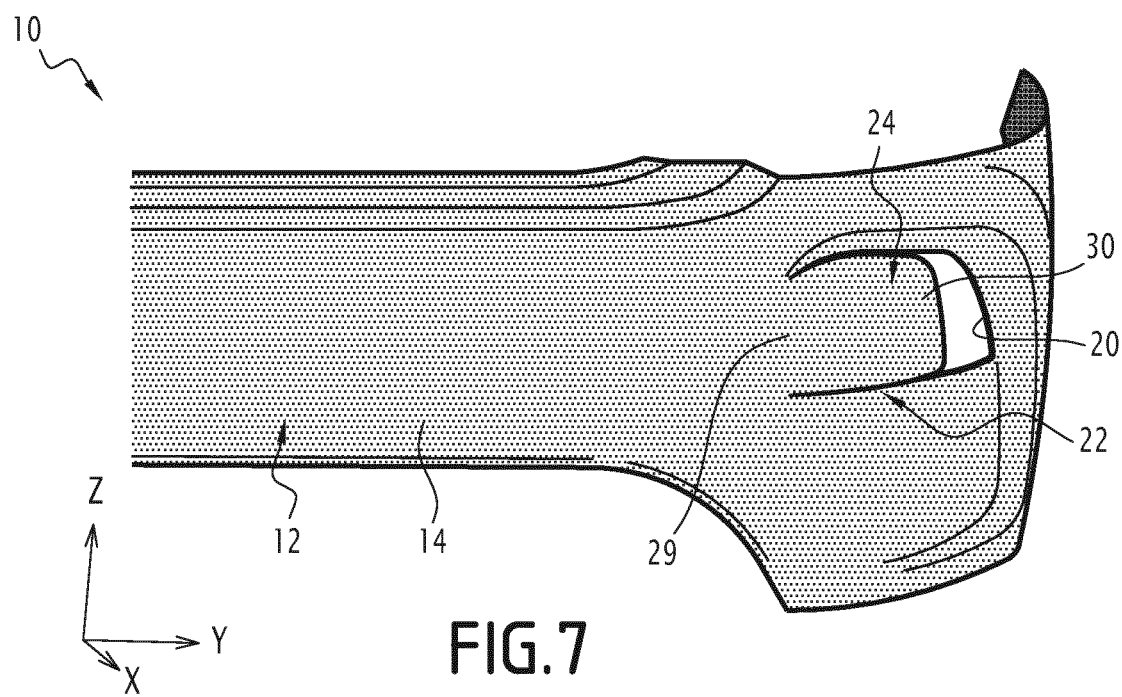
FIG. 7 shows a view similar to FIG. 1, wherein the air intake opening is released.

The second exemplary embodiment shown in FIGS. 6 and 7 differs from the first embodiment described above in that the flexible flaps 24, which are equal in number to the number of air intake openings 20, are made together in one piece with the bumper skin 12 and not applied to the bumper skin 12.

Each flexible flap 24 is then constituted by a portion of the bumper skin 12 that is cut to form one of the air intake openings 20, wherein the portion is cut out of only a part of its periphery in order to preserve a bridge of material connecting the flexible flap 24 to the remainder of the skin 12, wherein the material bridge forms a hinge 29 between the flap 24 and the bumper skin 12. The hinge 29 is, in the example shown, arranged at a lateral end of the shutter 24.

The hinge 29 then forms a fixed portion of the flexible flap 24 relative to the bumper skin 12. The end 30 of the flexible flap 24 opposite the hinge 29 forms a movable portion relative to the bumper skin 12 due to the flexibility of the flap 24. The flap 24 is, in the example shown, prolonged in an elongation direction from the hinge 29 to the end 30; thus increasing the flexibility of the flap 24.

The end 30 then forms a movable portion that is displaceable in a manner similar to the end portions 28 described above.

In common with the first and second exemplary embodiments, the front assembly 10 also comprises, with reference to FIGS. 3 to 5, a support element 31, while the shutter 22 comprises, for each air intake opening 20, an actuator 32 mounted between the support element 31 and the flexible flap 24.

The support element 31 is arranged inside the front assembly 10 relative to the bumper skin 12. It is fixed relative to the bumper skin 12; for this purpose, the support element 31 is typically attached to the bumper skin 12, for example by gluing, clipping, or any other attachment that is usually found in bumpers of a motor vehicle.

The support element 31 is made of a relatively rigid material, for example filled polypropylene.

The support element 31 comprises an air guide 34 for each air intake 20. This air guide 34 is recessed towards the inside of the front assembly 10 relative to the air intake opening 20.

The air guide 34 is delimited laterally by two vertical walls 36, 38. A first of the vertical walls 36 has a longitudinal end 40 flush with a side edge 42 of the air intake opening 20. The second vertical wall 38 is arranged to extend in the prolongation of the flexible flap 24 when the end portion 28, 30 of the flexible flap 24 is in its released position.

The air guide 34 also comprises a grid 44 extending between the vertical walls 36, 38 across the air guide 34.

The actuator 32 is adapted to control the movement of the end portion 28, 30 of the flexible flap 24 between its shuttering and releasing positions. For this purpose, the actuator 32 comprises a motorized body 50 fixed to the support element 31, and a movable member 52 in contact with the end portion 28, 30 and driven by the motorized body 50. The motorized body 50 is typically constituted by an electric motor.

According to a first variant, shown in FIG. 3, the movable member 52 is constituted by a cam 54 that is mounted to rotate about an axis of rotation 56 which, in the example shown, is substantially vertical. The cam 54 has a bearing surface 58 against the end portion 28, 30 of the flexible flap 24, wherein the bearing surface 58 is at a distance from the axis of rotation 56 that increases continuously from a proximal end 59A of the bearing surface 58 to a distal end 59B of the bearing surface 58.

The shutter 22 also comprises a member 60 for biasing the end portion 28, 30 to bear against the bearing surface 58.

This biasing member 60 is, in the example shown, constituted by a tension spring attached to the support element 31 and the end portion 28, 30.

Thus, when the cam 54 is oriented so that the end portion 28, 30 of the flexible flap 24 abuts the proximal end 59A of the bearing surface 58, the end portion 28, 30 is in its released position, while, when the cam 54 is oriented so that the end portion 28, 30 of the flexible flap 24 abuts the distal end 59B of the bearing surface 58, the end portion 28, 30 is in its shuttering position.

According to a second variant, shown in FIG. 4, the movable member 52 comprises a first connecting rod 62 hinged to a first axis 64 at the end portion 28, 30 of the flexible flap 24, and a second connecting rod 66 hinged to the first connecting rod 62 about a second axis 68 that is substantially parallel to the first axis 64. The second connecting rod 66 is mounted to pivot relative to the motorized body 50 about a third axis 70 that is substantially parallel to the first and second axes 64, 66, while the motorized body 50 is designed to rotate the second connecting rod 66 about the third axis 70. The first, second and third axes 64, 68, 70 are, in the example shown, substantially vertical axes.

Thus, when the end portion 28, 30 of the flexible flap 24 is in the released position and the second connecting rod 66 is pivoted about the third axis 70 to move the second axis 68 towards the first axis 64, this causes the end portion 28, 30 to move to its shuttering position. When, on the other hand, the end portion 28, 30 of the flexible flap 24 is in the shuttering position and the second connecting rod 66 is pivoted about the third axis 70 to move the second axis 68 in a direction opposite to the first axis 64, this causes the end portion 28, 30 to move to its released position.

According to a third variant, shown in FIG. 5, the actuator 32 is in the form of an electric jack. The body 50 is then constituted by the body of the jack, while the movable member 52 is constituted by the rod of the jack, wherein the end of the rod is hooked to the end portion 28, 30 of the flexible flap 24.

Thus, when the jack is retracted, the end portion 28, 30 is in the released position, and when the jack is extended, the end portion 28, 30 is in the shuttering position.

Although the embodiments described above have been described for the case where the bumper skin 12 only comprises two air intakes, the invention is not restricted to this example alone, and the bumper skin 12 may have any number of air intakes.

Although the description of the invention given above is restricted to the case where the openings 20 are air intake openings, the invention is not limited to this single embodiment. Thus, in a variant of the invention (not shown), the front assembly 10 comprises at least one light source arranged opposite an opening 20 set back towards the inside of the front assembly 10 with respect to the bumper skin 12, and the shutter 22 then makes it possible to selectively hide and uncover the light source.

The description given above is also applicable to a rear assembly of a motor vehicle, wherein the front and rear directions, on the one hand, and right and left, on the other hand, are simply reversed.

The invention claimed is:

1. A front or rear assembly of a motor vehicle, comprising a bumper skin defining an outer surface that is visible from the outside of the front or rear assembly and has at least one opening in the outer surface, the front or rear assembly also comprising a shutter for selectively closing and releasing said opening, at least partially,
wherein the shutter comprises a flexible flap having a fixed portion relative to the bumper skin and a movable portion relative to the bumper skin, the movable portion being movable between a shuttering position in which the opening is shuttered by the flexible flap and a releasing position in which the opening is released, and
wherein, in the releasing position, the movable portion is recessed towards the inside of the front or rear assembly relative to the bumper skin.

2. The front or rear assembly according to claim 1, wherein the flexible flap is made together in one piece with the bumper skin.

3. The front or rear assembly according to claim 1, wherein the flexible flap is attached to the bumper skin.

4. The front or rear assembly according to claim 1, wherein the movable portion is constituted by an end portion of the flexible flap.

5. The front or rear assembly according to claim 4, wherein the flexible flap is elongated along an elongation direction, and the end portion is arranged at one end of the flexible flap in said elongation direction.

6. The front or rear assembly according to claim 1, wherein the shutter comprises an actuator for controlling the displacement of the movable portion between its shuttering and releasing positions.

7. The front or rear assembly according to claim 6, comprising a support element arranged inside the front or rear assembly with respect to the bumper skin, the support element being fixed relative to the bumper skin, the actuator being mounted between the support element and the flexible flap.

8. The front or rear assembly according to claim 7, wherein the support element comprises an air guide having a wall arranged to extend in the extension of the flexible flap when the movable portion of the flexible flap is in its releasing position.

9. A front or rear assembly of a motor vehicle, comprising a bumper skin defining an outer surface that is visible from the outside of the front or rear assembly and has at least one opening in the outer surface, the front or rear assembly also comprising a shutter for selectively closing and releasing said opening, at least partially,
wherein the shutter comprises a flexible flap having a fixed portion relative to the bumper skin and a movable portion relative to the bumper skin, the movable portion being movable between a shuttering position in which the opening is shuttered by the flexible flap and a releasing position in which the opening is released,
wherein the shutter comprises an actuator for controlling the displacement of the movable portion between its shuttering and releasing positions, and wherein the actuator comprises a cam mounted to rotate about an axis of rotation, and an electric motor to rotate the cam about the axis of rotation, the cam having a bearing surface bearing against the movable portion of the flexible flap, said bearing surface being at a variable distance from the axis of rotation, and the shutter comprises a biasing member for biasing the movable portion to bear against the bearing surface of the cam.

10. The front or rear assembly according to claim 6, wherein the actuator is constituted by an electric jack having an end attached to the movable portion of the flexible flap.

11. The front or rear assembly according to claim 6, wherein the actuator comprises a first connecting rod hinged to the movable portion of the flexible flap about a first axis, and a second connecting rod hinged to the first connecting rod about a second axis that is substantially parallel to the first axis, the second connecting rod being mounted to pivot relative to the bumper skin about a third axis that is substantially parallel to the first and second axes, the actuator further comprising an electric motor to rotate the second connecting rod about the third axis.

12. The front or rear assembly according to claim 1, wherein the bumper skin has an inner surface opposite to the outer surface and at least one through-aperture into the inner surface and the outer surface, the through-aperture having an elongated shape extending along an elongated direction, the through-aperture defining at least two air-intake opening regions and a central region interposed between the at least two air-intake opening regions,
  wherein the flexible flap is made of one piece and is attached to the bumper skin, the flexible flap extending along the elongated direction, and
  wherein the flexible flap comprises:
    a central portion forming the fixed portion of the flexible flap, the central portion being arranged to face the central region of the through-aperture and being interposed between the at least two air-intake opening regions, the central portion closing the central region of the through-aperture, and
    at least two end portions, each end portion being arranged at one end portion of the flexible flap in said elongated direction, each end portion forming a movable part of the flexible flap and being arranged to face a respective air-intake opening region.

13. The front or rear assembly according to claim 1, wherein, in the shuttering position, the movable portion is flush with the bumper skin.

14. A front or rear assembly of a motor vehicle, comprising a bumper skin defining an outer surface that is visible from the outside of the front or rear assembly and has at least one opening in the outer surface, the front or rear assembly also comprising a shutter for selectively closing and releasing said opening, at least partially,
  wherein the shutter comprises a flexible flap having a fixed portion relative to the bumper skin and a movable portion relative to the bumper skin, the movable portion being movable between a shuttering position in which the opening is shuttered by the flexible flap and a releasing position in which the opening is released,
  wherein the shutter comprises an actuator for controlling the displacement of the movable portion between its shuttering and releasing positions, and
  wherein the front or rear assembly comprises a support element arranged inside the front or rear assembly with respect to the bumper skin, the support element being fixed relative to the bumper skin, the actuator being mounted between the support element and the flexible flap.

* * * * *